3,199,016
POWER SUPPLY REGULATING SYSTEM
William J. Greene, Scotch Plains, and Evans H. Daggett, Murray Hill, N.J., assignors to Air Reduction Company, Incorporated, New York, N.Y., a corporation of New York
Filed Nov. 13, 1959, Ser. No. 852,882
12 Claims. (Cl. 321—25)

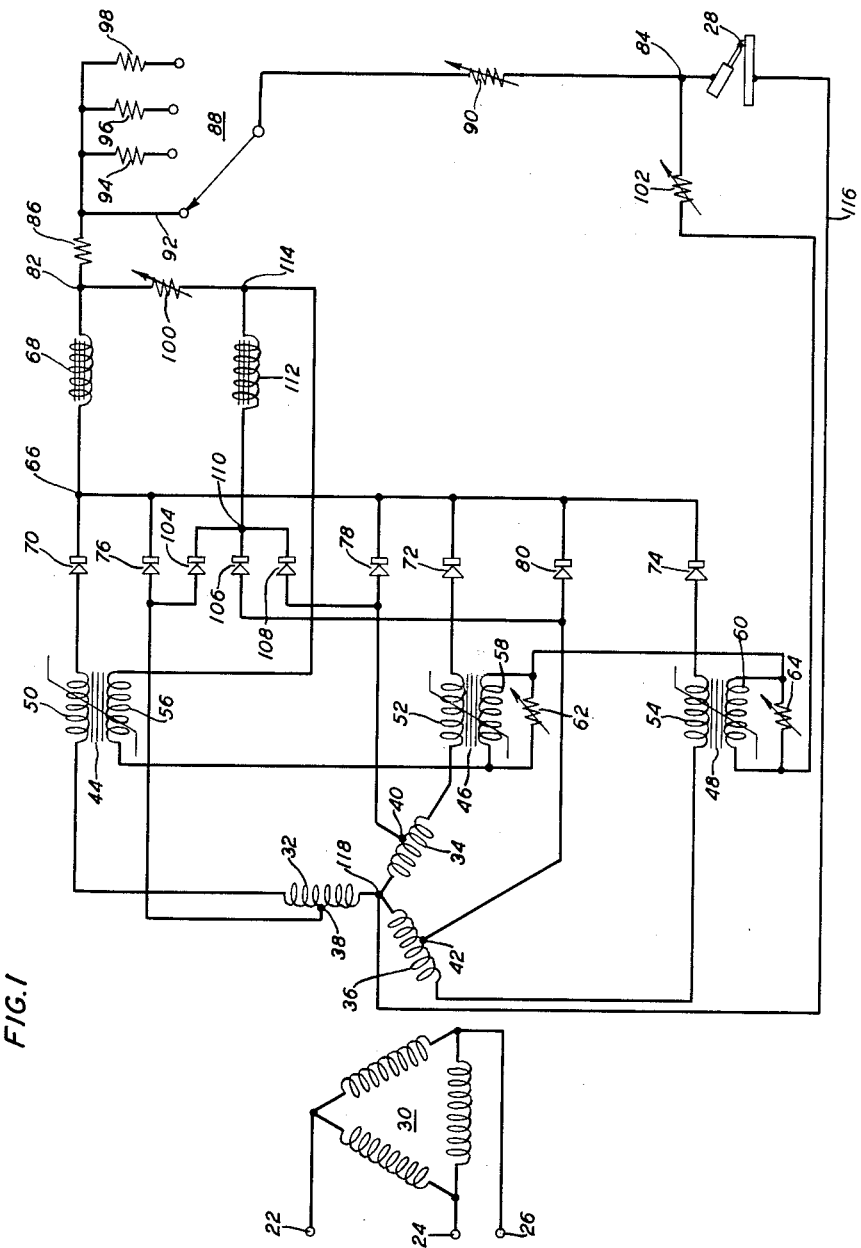

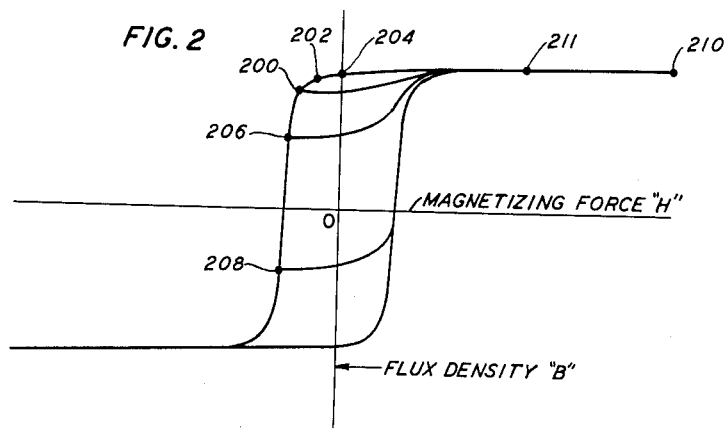
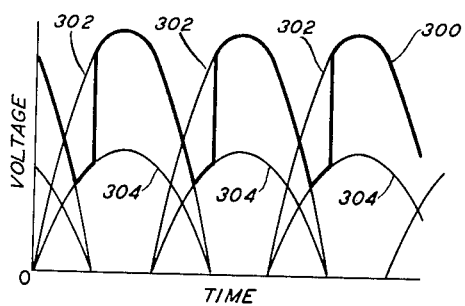
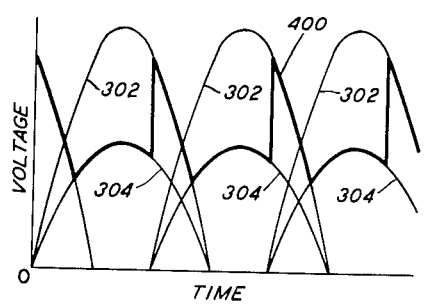
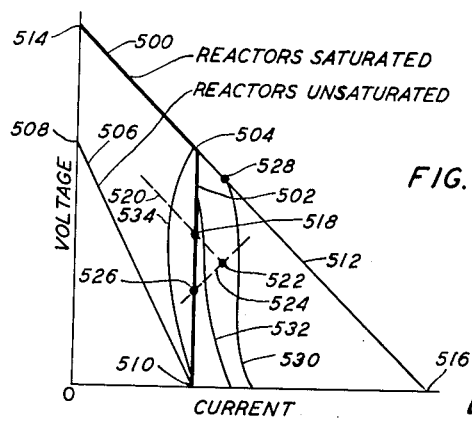
INVENTORS
EVANS HERBERT DAGGETT
WILLIAM JOHN GREENE
ATTORNEY United States Patent Office 3,199,016
Patented Aug. 3, 1965

This invention relates to power supply regulating systems and more particularly to a constant current supply for arc welding.

An object of the invention is to improve the constancy of the current supplied by the power supply system to a utilization device, the value of constant current being adjustable at will.

Another object is to shorten the time required by the system to recover the normal current condition following a sudden change of impedance or of voltage within the system or in the primary power source.

A further object is to provide regulated currents of magnitude less than generally available in constant current systems, thus to provide means for welding metal foil and other relatively thin objects and materials.

A feature of the invention is the use of magnetic amplification with negative feedback to improve current constancy and shorten recovery time.

Another feature is an auxiliary or "keep-alive" power supply is relatively small due to the regulatory action of vice in phase with the main power supply to avoid unstable operating conditions which might tend to arise during periods when the current from the main power supply is relatively small due to the regulatory action of the negative feedback effect. Being in phase, this auxiliary power supply requires no phase splitting elements.

A further feature is that the current control is responsive directly to voltage fluctuations in the main power supply as well as to changes in load current whether caused by such power supply fluctuations or by impedance changes in the load or utilization device.

In a system illustrated herein, a magnetic amplifier comprising a reactor with a saturable magnetic core is provided. The load current is passed through a main winding of the reactor and through a rectifier. One or more resistors are inserted in the load circuit to provide a feedback voltage for controlling the degree of saturation of the magnetic core. The feedback voltage is applied to a control circuit connected in parallel with one or more of the resistors in the load circuit, this parallel connection including a control winding of the reactor. The feedback is made negative by relative poling of the main and control windings so that the magnetizing force exerted upon the saturable core by the control winding is opposed to the magnetizing force exerted upon the core by the main winding. The control winding and elements connected thereto constitute the input circuit of the magnetic amplifier while the main winding and elements associated therewith constitute the output circuit.

The keep-alive power supply as well as a sample of the power supply voltage is obtained from a tap connection to the secondary winding of the power supply voltage stepdown transformer. Load current fluctuations due to changes in load conditions, and power supply voltage variations, are fed to the control winding through separate choke coils.

The system is illustrated as applied to a three-phase power supply but the same principles may be employed with any number of phases or with a single phase supply. In a single phase system, the reactor in the keep-alive circuit should have adequate smoothing effect to produce a relatively constant current supply to the arc as the output voltage periodically falls to zero at each half cycle.

Other objects, features and advantages will appear from the following more detailed description of illustrative embodiments of the invention, which will now be given in conjunction with the accompanying drawings.

In the drawings,

FIG. 1 is a schematic circuit diagram of a constant current supply system suitable for use in arc welding;

FIG. 2 is a graph of an illustrative magnetic hysteresis loop useful in explaining the regulatory action in the system of FIG. 1;

FIGS. 3 and 4 are graphs of illustrative wave forms also useful in explaining the operation of the system of FIG. 1; and FIG. 5 is a graph of voltage vs. current relations, illustrative of a utilization device or load such as a welding arc, useful in explaining the regulatory action in the system of FIG. 1.

In FIG. 1, there is shown a three-phase alternating current power supply system represented by input leads 22, 24, 26, for supplying power to a constant current type of utilization device exemplified by a welding arc 28. The power supply may, for example, be one operating at 460 volts and 60 cycles per second. A voltage reducing transformer is shown having a delta connected primary circuit 30 and Y-connected secondary windings 32, 34, 36. In an embodiment that has been built and successfully tested, the secondary phase windings produce 70 volts each and are center-tapped to provide 35 volts each at the midpoints, 38, 40, 42, respectively.

A set of saturable reactors 44, 46, 48 is provided, comprising respectively, main windings 50, 52, 54, and associated control windings 56, 58, 60. Two of the control windings, for example windings 58 and 60, are provided with adjustable shunt resistors 62 and 64, respectively, to equalize differences in magnetic properties of the iron used in construction of the reactor cores.

A plurality of rectifiers such as germanium or silicon diodes are provided, as at 70, 72, 74, 76, 78, 80, 104, 106 and 108.

The main reactor winding 50 has one end connected to the high-voltage terminal of the power secondary winding 32. The other end of the winding 50 is connected to a terminal 66 of a load choke coil 68 through the rectifier 70. One end of the main reactor winding 52 is connected to the high voltage end of the secondary winding 34. The other end of the winding 52 is connected to the load choke terminal 66 through the rectifier 72. Similarly, one end of the winding 54 is connected to the secondary winding 36 and the other end is connected to the terminal 66 through the rectifier 74.

The secondary tap points 38, 40, 42 are connected to the load choke terminal 66 through the rectifiers 76, 78, 80, respectively.

The second terminal 82 of the load choke 68 is connected to the positive terminal 84 of the arc 28 through two parallel paths. One of these paths, the main load path, passes through a load current limiting resistor 86, a coarse adjustment selector switch 88, and a fine current adjustment rheostat 90. The switch 88 provides a selection of series resistors 92, 94, 96, 98, of which one, for example 92, may be of substantially zero resistance. The other path, the reactor control path, passes through a rheostat 100, the control winding 56, the parallel combination of the control winding 58 and adjustable shunt 62, the parallel combination of the control winding 60 and adjustable shunt 64, and another rheostat 102.

The set of rectifiers 104, 106, 108, each have one terminal connected to a respective tap 38, 40, 42 of the transformer secondary windings. The other terminal of each of these rectifiers is joined in a common connection to one side 110 of a control choke coil 112. The other side of the choke coil 112 comprises a terminal 114 that is intermediate between the rheostat 100 and the control winding 56.

The negative terminal of the arc 28 is connected through a lead 116 to the common low-voltage point 118 of the secondary windings 32, 34, 36.

The operation of the system of FIG. 1 will be described with reference to an illustrative form of B–H hysteresis loop shown in FIG. 2 and to representative wave forms shown in FIGS. 3 and 4.

Each of the main reactor windings 50, 52, 54 has a hysteresis loop of the general form shown in FIG. 2. The operation of winding 50 will be described in detail. The windings 52 and 54 operate similarly to winding 50 and contribute their shares of the power one-third and two-thirds of a cycle later, respectively, with respect to the winding 50. The control winding 56 normally provides a biasing magnetizing force such as to determine an initial operating point such as point 200 on the hysteresis loop in FIG. 12. In resetting to point 200, the flux density in the core is reduced to a value of below saturation level. In reducing the flux in the core of the reactor, a voltage is induced in both the power and control windings. The time integral of this voltage is proportional to the change in flux and the number of turns in the windings. The volt-seconds stored in the power winding must be absorbed on the power cycle to return the flux to the saturation level before full conduction begins. By decreasing the biasing magnetizing force a new operating point such as the point 202 may be established. At this point on the hysteresis loop, fewer volt-seconds have been stored in the power winding and the flux density will be returned to saturation level earlier in the power cycle. By further reducing the biasing magnetizing force to zero, an operating point 204 may be established at which the reactor 44 is substantially saturated. In this state, the inductive reactance of the winding 50 is negligibly small. Other operating points such as points 206 and 208 may be established by increasing the biasing magnetizing force.

When a power cycle of voltage is impressed upon the winding 50, the current in the power winding is initially held to a small value sufficient to overcome the magneto-motive force of the control winding and to supply just enough additional magneto-motive force to move the operating point around a minor loop to saturation level. The exciting current in the winding 50 gradually shifts the operating point of the reactor 44 along a minor loop toward the saturation level. As this shift occurs, the inductive reactance of the winding 50 decreases, thereby increasing the current in the winding 50. The increase in the current in the winding 50 is small at first but as saturation is approached the increase becomes great rather suddenly as saturation sets in. The sudden increase in current provides a relatively large increase in magnetizing force which shifts the operating point far away from the initial portion of the loop, for example to a point such as the point 210. The winding 50 is now substantially free from inductance and the current through it is limited only by the resistance of the winding and connected circuits. When the power voltage impressed upon the winding 50 has passed its maximum and is decreasing, the magnetizing current provided by the current through the winding 50 continues to greatly offset the effect of the current in the control winding 56 and maintains the reactor 44 in the saturated state until the current in the winding 50 has fallen off to a very small value close to the end of the power cycle. In summary, during the power cycle, the current in the winding 50 starts out relatively very small and remains small until saturation occurs. Thereupon, the current suddenly increases and substantially follows the variation of the impressed power voltage until practically the end of the power cycle. The point in the cycle at which saturation sets in is determined by the initial operating point on the hysteresis loop which is in turn determined by the initial biasing magnetizing force. When the impressed power voltage returns to zero, the reactor 44 returns to its initial state as determined by the current in the control winding 56. It will be noted that at all times the magnetizing force exerted upon the core by the control winding is opposed to the magnetizing force exerted upon the core by the main winding.

The rectifier 70 serves as a half-wave rectifier for alternating current power fed from the power winding 32 through the reactor winding 50. The rectified current is smoothed by the load choke 68. The smoothed output current passes through a feedback resistance network comprising the resistor 86, the resistor selected by the tap switch 88, and the rheostat 90. This series resistance network is in parallel with the control windings of each of the reactors so that a portion of the output current is used to control or change the initial flux density in the magnetic cores of the reactors 44, 46, 48. This initial value of the flux density will sometimes be called the "reset flux" in the reactor cores. The reset flux determines what proportionate part of the power cycle will elapse before saturation sets in. In particular, the reset flux determines how many volt-seconds the reactor will absorb of the impressed voltage before saturation is effected. Thus, the current through the combination of the main reactor winding and the associated rectifier is controlled by the output current through the arc or other utilization device, and the power may be regulated to have a constant current characteristic. Because a small change in current through the control winding results in a relatively large change in current through the main winding, the saturable reactor functions as a magnetic amplifier. Since the magnetizing effects of the main and control currents are opposed, the feedback is negative.

In addition to the control exerted by the output current, there is provided a control to compensate directly for voltage variations in the power line. This control is responsive to the voltages at the mid-points 38, 40, 42 of the power secondary windings 32, 34, 36, respectively. Power is fed from these mid-points through the rectifiers 104, 106, 108, respectively, and the control choke coil 112 to join with the main control currents at the junction point 114. When the power voltage at the mid-points varies, the control current through the control windings 56, 58, and 60 is varied to compensate for the variations in the power voltage. For example, an increase in power line voltage causes additional rectified current to flow through the control choke coil and the reactor control windings in such a direction that more volt-seconds are absorbed by the reactors. This delays the instant that saturation sets in, to compensate for the line voltage increase.

A keep-alive current is supplied to the load through the rectifiers 76, 78, 80, which are connected to the mid-points 38, 40, 42, respectively, of the secondary windings of the power transformer. The currents from the respective rectifiers are combined at the junction point 66 and pass through the load choke coil 68 and thence to the utilization circuit, providing a current at all times, to tide over the periods when the current through the unsaturated reactor is negligibly small. The keep-alive current, in the case of an arc load, is made sufficient to prevent extinguishment of the arc during periods of little or no current flow through the main reactor windings.

The resistors 62 and 64 in parallel with the control windings 58 and 60 respectively, are provided to compensate for inequalities in the magnetic properties of the reactor cores. By chossing appropriate values of resistance, the same control current will make all the reactors saturate at the same point in the voltage or power cycle in each case, even though the B-H curves are different for the respective cores.

FIGS. 3 and 4 show approximate wave forms of the voltage impressed upon the load choke coil junction 66 by the combined inputs coming from the saturable reactors and from the keep-alive circuit. FIG. 3 is illustrative of a condition in which the initial condition of the saturable cores is represented by a point such as point 202, which is nearer to saturation than point 200. FIG. 4 is illustrative of a condition further away from saturation than point 200, for example, the condition at point 206.

In FIG. 3, the combined voltage attributable to the saturable reactors and the keep-alive circuit is shown by the heavy curve 300. The full voltage impressed by successive power cycles upon the main winding of the saturable reactor is shown by the light curves 302. The voltage of successive cycles of the keep-alive circuit are shown by the light curves 304. The combined voltage as shown in curve 300 follows the keep-alive curve 304 very approximately during those periods when the reactor core is unsaturated. When saturation sets in, the voltage rises abruptly to a point substantially on the curve 302 and follows this curve closely until it again meets the keep-alive voltage curve 304. The partial overlapping of the successive power cycles does not materially alter the general shape of the resultant curve 300.

In FIG. 4, the combined voltage attributable to the saturable reactors and the keep-alive circuit is shown by the heavy curve 400. The form of curve 400 is approximated in the same way as is the curve 300 in FIG. 3, the only difference being that the saturation occurs at a later point in the power cycle in the case of curve 400 as compared with the case of curve 300. The angle of the applied reactor voltage at which saturation occurs in the reactor is controlled by the reset flux therein and may be referred to as the firing angle of the self-saturating reactor-rectifier combination. Adjustment of this firing angle determines the voltage applied to the load and consequently the value of load current flow.

A comparison of FIGS. 3 and 4 shows that the average combined voltage is greater in the case of FIG. 3 than in the case of FIG. 4. In neither case does the instantaneous value of the combined voltage come close to zero, because the resultant curve 300 or 400 is always well up on the high part of the keep-alive curve 304. Thus the keep-alive power supply works satisfactorily even though it is exactly in phase agreement with the main power supply, and no phase splitting is required to produce overlapping.

The current in the control windings 56, 58, 60 follows the average value of a curve such as 300 or 400 and the control current is arranged to be in the proper direction so that when the control current, together with the load current, tends to increase, the magnetizing force is set back in the direction of the operating point 208, in order to delay saturation of the core and so cut down the load current. In case the load current tends to decrease, the action is reversed, causing the operating point to shift in the direction of the operating point 204, in order to cause earlier saturation.

The line voltage control currents passing through the control choke 112 combine with the control currents passing through choke 68 to determine the operating point of the core of the saturable reactor.

FIG. 5 shows a desirable type of current regulation curve the indicated performance of which may be approximated in the system of FIG. 1. The figure is a graph of voltage vs. current in the arc or other utilization device 28. The regulation curve is shown in heavy line and comprises a sloping portion 500 and a vertical constant current portion 502 which portions meet at a point 504. Under the condition of unsaturated reactors, the characteristic line of the arc is shown at 506 and is a straight line connecting the point 508 of open-circuit arc voltage and no current with the point 510 of no voltage and short-circuit current. Under the condition of fully saturated reactors, the characteristic line of the arc is shown at 512 connecting points 514 and 516. It will be noted that the voltage at the point 508 is determined principally by the mid-point voltage of the power secondary windings, as at the point 38 on the winding 32. The voltage at the point 514 depends upon the full voltage of the power secondary winding and will be somewhat less than twice the voltage at the point 508. The currents at the points 510 and 516 are determined by the various impedance in the system.

To insure constant current regulation over the largest possible range of arc voltages, the appropriate current value to be maintained constant is the value at the point 510, namely the short circuit current of the arc with the reactors unsaturated.

In a system having the constant current characteristic indicated by the line 502, the regulating action is substantially as follows. Suppose that the system is initially operating at the point 518 on the line 502. If now, the current increases, the sysetm will, in the absence of regulating action, move along a sloping line 520 to a new operating point 522. If regulation is then applied, as by decreasing the saturation of the reactors to reduce the current supplied to the arc by the reactors, the system may be caused to shift its operating point along a line 524 to an operating point 526 which is on the line 502. The system has thus been restored to the original current but at a reduced voltage. In the actual system, the excursion away from the line 502 to the point 522 may be made negligibly short so that the system to all intents and purposes remains upon the line 502 during the regulating process.

The value of the constant load current may be adjusted as desired by manipulating the coarse adjustment switch 88 and the fine adjustment rheostat 90.

The setting of the bend point 504 is effected mainly by adjusting the rheostat 100 which adjusts the relative strength of the arc current and the control current sent to the reactor windings. Before adjustment, for example, the bend point of the characteristic might be at the point 528. The regulation curve might be as shown for example at 530. When the bend point has been properly adjusted, the shape of the regulation curve may still depart from verticality as shown by examples at 532 and 534. A satisfactory approximation to a vertical characteristic may be obtained by adjusting the rheostat 102. It may be necessary in some cases to readjust both rheostats to obtain the best current characteristic at the desired current value. In general, however, it will be found that, once satisfactory adjustments of the rheostats 100 and 102 have been made for one value of arc current, these adjustments will hold good without change when the system is readjusted to another current value.

In an embodiment that has been built and successfully operated, wherein the full power secondary phase voltage is 70 volts and the mid-point phase voltage is 35 volts, the reactors 44, 46, 48 have magnetic cores composed of what is known in the art as square hysteresis loop material which is available under the name of "Orthonol." This material is composed approximately of 50 percent nickel and 50 percent iron and is characterized as "grain oriented." The saturation flux density of the material is approximately 15,500 gauss and the coercive force approximately 0.2 oersteds. Each reactor had a main winding of 230 turns of No. 12 wire and a control winding of 50 turns of No. 17 wire, wound upon a toroidal core having a mean length of magnetic path of 29.9 centimeters and a cross-sectional core area of 6.54 square centimeters. The core was tape-wound from a tape of the square hysteresis loop material 0.006 inch thick and an inch and a half wide over a cylindrical mandrel 3 inches in diameter.

The load choke coil 68 had an inductance of 0.1 henries and the control choke coil 112 an inductance of 10 henries together with a resistance of 220 ohms. The various resistors and rheostats had the following values:

| Resistor or Rheostat: | Resistance in ohms |
|---|---|
| 86 | 2 |
| 90 | maximum 20 |
| 92 | practically 0 |
| 94 | 30 |
| 96 | 40 |
| 98 | 475 |
| 100 | maximum 200 |
| 102 | maximum 80 |

This embodiment had a current range of from about ¾ ampere to 10 amperes, thereby filling a current range just below the lower limit of most available welding supply systems.

A test of the dynamic response to fast load changes was made by increasing the arc length from 1/16 inch to ¼ inch in a very short time by means of a spring-operated mechanical device. The output current was recorded and it was found that the system recovered in about 0.025 second, which is approximately one and one-half cycles of a 60 cycle power supply. The recovery time was found to be substantially independent of the output current.

A test of dynamic response to fast voltage variations on the power supply line was made by rapidly inserting and removing three series resistors, one in each leg of the three phase primary supply. The recovery time was again approximately one and one-half cycles. Slow changes in line voltage were found to result in relatively small changes in arc current.

The embodiment tested was used in welding operations on thin sheets of material such as stainless steel and was found to work successfully with sheets of 0.003 inch thickness to 0.010 inch.

While the invention is capable of supplying smaller regulated currents than are generally available from constant current welding systems and is therefore especially adapted for use in welding metal foil and other very thin materials or objects, the invention is not limited to any particular current range. It will be evident that the invention is applicable to all kinds of welding regardless of whether the welding arc is drawn between an electrode and a workpiece or between two electrodes.

While illustrative forms of apparatus in accordance with the invention have been described and shown herein, it will be understood that numerous changes may be made without departing from the general principles and scope of the invention.

What is claimed is:

1. In a current regulating system, in combination, a saturable magnetic core, a main winding and a control winding each coupled to said core, first and second rectifiers, first and second choke coils, feedback resistance means, means connecting an alternating current source to a load by way of said main winding, said first rectifier, said first choke coil and said feedback means in that order, means for obtaining from said alternating current source a power supply of alternating current of materially less than the full voltage of said source, means establishing a path for said power supply of reduced voltage to said load by way of said second rectifier, said second choke coil and said control winding in that order, and a bridging resistor connected between the junction of the first choke coil and the said feedback means and the junction between the second choke coil and the said control winding.

2. In a current regulating system, in combination, a power transformer including a secondary winding having a full voltage terminal and a reduced voltage tap, a saturable magnetic core, a main winding and a control winding each coupled to said core; first, second and third rectifiers, a load choke coil, a control choke coil, a current limiting resistor, a coarse current adjusting resistor, a current adjusting rheostat, a bridging rheostat, a control circuit rheostat; means establishing a main load current path from the full voltage terminal of the power transformer to a load via said main winding, said first rectifier, said load choke coil, said current limiting resistor, said coarse current adjusting resistor and said current adjusting rheostat in that order; means establishing an auxiliary load current path from said reduced voltage tap to said load choke coil via said second rectifier; and means establishing a control current path from said reduced voltage tap to said load via said third rectifier, said control choke coil, said control winding and said control circuit rheostat in that order; said bridging rheostat being connected from the junction of said load choke coil and said current limiting resistor to the junction of said control choke coil and said control winding.

3. A constant current arc welding system comprising a magnetic amplifier including a core of magnetic material with main and control windings thereon and a rectifier in circuit with said main winding, said reactor core being saturated by current flow through said main winding and said rectifier during half-cycles of alternating current of one polarity, and said flux in said core being reset by current flow in said control winding when current flow through said main winding is blocked by said rectifier during half-cycles of alternating current of the opposite polarity, the reset value of flux in said core determining the volt-seconds the reactor will absorb before saturation of said core occurs on the next conducting half-cycle of said amplifier when after the delay period thus imposed load current flows through its main winding and series connected rectifier to a load circuit, a load circuit including a choke coil and a resistor connected in series with one another and the series connected main winding and rectifier of said amplifier for supplying current to a welding arc for a source of alternating voltage applied to said amplifier, means controlling the excitation of said control winding of said amplifier in response to voltage variations of said source of alternating voltage applied to said load circuit through said amplifier for controlling the operation of said amplifier to maintain the flow of current in said load circuit substantially constant, the magnetizing force exerted on said core of said amplifier by current flow in said control winding being opposed by the magnetizing force exerted on said core by current flow in said main winding and said means including a rectifier poled as said rectifier of said amplifier to pass control current through a second choke coil to said control winding of said amplifier, an adjustable resistance connected between the junction of said second choke coil and said control winding and the junction of said load circuit choke coil and said load circuit resistor, and a second adjustable resistor connected in series circuit with said control winding, and means for supplying keep-alive current through said load circuit to said arc from said source of alternating voltage at a voltage less than that voltage that can be applied to said load circuit through said amplifier, said means including a circuit in shunt to said amplifier and including a second rectifier poled to pass current to the load circuit in the same direction as said rectifier of said amplifier.

4. A constant current polyphase arc welding system comprising a magnetic amplifier in each phase circuit between the polyphase input of said system and a load circuit for supplying current to an arc, each magnetic amplifier including a core of magnetic material with main and control windings thereon and a rectifier in circuit with said main winding, said reactor core being saturated by current flow through said main winding and said rectifier during half-cycles of alternating current of one polarity, and said flux in said core being reset by current flow in said control winding when current flow through said main winding is blocked by said rectifier during half-cycles of alternating current of the opposite polarity, the reset value of flux in said core determining the volt-seconds the reactor will absorb before saturation of said core occurs on the next conducting half-cycle of said amplifier when after the delay period thus imposed load current flows through its main winding and series connected rectifier to said load circuit, a resistor and a choke coil in said load circuit, a control circuit including the control winding of each of said amplifiers connected in series circuit with one another, means for adjusting the amount of control current flow in said control circuit that passes through the control winding of each of said amplifiers, the magnetizing force exerted on a core of each of said amplifiers by current flow in its control winding being opposed by the magnetizing force exerted on said core by current flow in its main winding, means controlling the control current flow in said control circuit in response to voltage variations of the polyphase input of said system for controlling the operation of each of said amplifiers to maintain the flow of current in said load circuit substantially constant, said means including adjustable resistors respectively connecting said control circuit in shunt with said resistor in said load circuit and a second choke coil having one terminal connected through one of said adjustable resistors to the junction between said load circuit choke coil and said load circuit resistor and having its other terminal connected to each phase voltage of the polyphase input of said system through a set of rectifiers each of which is poled to pass current to the load circuit in the same direction as the rectifiers of said amplifiers, and means for supplying keep-alive current through said choke coil and resistor of said load circuit to said arc from said polyphase input of said system at a voltage less than the polyphase input voltage of said system applied to the polyphase input voltage of said system applied to said load circuit through said amplifiers, said means including a second set of rectifiers each of which is in a different circuit respectively shunting each of said amplifiers and each of which is poled to pass current to the load circuit in the same direction as the rectifiers of said amplifiers.

5. In a power supply regulating system for an arc, in combination, an alternating current source, a saturable reactor comprising a control winding and a power winding, said power winding being connected to said source, a power transmission path between said power winding and the arc, said path including in the order named, a first rectifier, a first choke coil, and a feedback resistor; an arc keep-alive transmissive path between said alternating current source and the arc, said path including in the order named, a second rectifier, said first choke coil and said feedback resistor; a first control transmission path between the junction of said first choke coil with said feedback resistor, and the arc, said path including in the order named, a coupling resistor, said control winding and a variable resistor; and a second control transmission path between said alternating current source and the arc, said path including in the order named, a third rectifier, a second choke coil of relatively greater reactance value than said first choke coil, said control winding and said variable resistor.

6. In a power supply regulating system for an arc, in combination between an alternating current source and the arc, a power path including in the order named a power winding of a saturable reactor, a first rectifier, a first choke coil, and a feedback resistor; an arc keep-alive path including in the order named a second rectifier, said first choke coil, and said feedback resistor; a first control path including in the order named the said portions of said power path and of said arc keep-alive path through and including said first choke coil, together with a coupling resistor, a control winding of said saturable reactor for controlling said power winding thereof, and a variable resistor, said coupling resistor, said control winding and said variable resistor being connected in parallel with said feedback resistor; and a second control path including in the order named a third rectifier, a second choke coil, said control winding, and said variable resistor.

7. Apparatus according to claim 6, in which said second choke coil has a reactance value several times that of said first choke coil.

8. In a power supply regulating system for an arc, in combination between an alternating current source and the arc, a power path including in the order named a power winding of a saturable reactor, a first rectifier, a first choke coil, and a feedback resistor; arc keep-alive means including said first choke coil and said feedback resistor; a first control path extending from said alternating source through said power winding, said first rectifier, said first choke coil, a coupling resistor, a control winding of said saturable reactor for controlling said power winding thereof, and a variable resistor in the order named, to the arc; and a second control path extending from said alternating current source through a second rectifier, a second choke coil, and said control winding in the order named to the arc.

9. In a power supply regulating system for an arc, in combination between an alternating current source and the arc, a power winding of a saturable reactor, first and second rectifiers, a first choke coil, said power winding and said first rectifier being connected between said alternating current source and said first choke coil in parallel with said second rectifier; a serial circuit branch extending from said alternating source to the arc, said serial circuit including in the order named a third rectifier, a second choke coil, a control winding of said saturable reactor for controlling said power winding thereof, and a variable resistor; a feedback resistor connected between said first choke coil and the arc, and a coupling resistor connected between the junction of said first choke coil and said feedback resistor and the junction of said second choke coil and said control winding.

10. In a power supply regulating system for an arc, in combination, an alternating current source, a saturable reactor comprising a control winding and a power winding, said power winding being connected to said source, a power transmission path between said power winding and the arc, said path including in the order named, a first rectifier, a choke coil, and a feedback resistor; means to feed back a control current from said feedback resistor to said control winding to regulate the supply of power to the arc; means to provide alternating current arc keep-alive power in phase with said alternating current source, and means for feeding power from said keep-alive means to the arc through an arc keep-alive transmission path including in the order named, a second rectifier, said choke coil and said feedback resistor.

11. Apparatus according to claim 1, together with means for maintaining said power supply of lesser voltage substantially in phase with the first mentioned alternating current source.

12. In a current regulating system, in combination, a saturable magnetic core, a main winding and a control winding each coupled to said core, first and second rectifiers, first and second choke coils, feedback resistance means, means connecting an alternating current source to a load by way of said main winding, said first rectifier, said first choke coil and said feedback means in that order, means for obtaining alternating current power in phase with the power from said alternating current source and of materially less than the full voltage of said alternating current source, means establishing a path for said power supply of reduced voltage to said load by way of said second rectifier, said second choke coil and said control winding in that order, and a bridging resistor connected between the junction of the first choke coil and the said feedback means and the junction between the second choke coil and the said control winding.

References Cited by the Examiner

UNITED STATES PATENTS

| | | | |
|---|---|---|---|
| 1,610,920 | 12/26 | Bethenod | 219—131 |
| 2,018,348 | 10/35 | Dijksterhuis | 323—89 |
| 2,157,977 | 5/39 | Alrig | 321—19 |
| 2,265,930 | 12/41 | Scott | 219—131 |
| 2,542,852 | 2/51 | Whitesell | 321—25 |
| 2,660,702 | 11/53 | Arvidsson | 323—89 |
| 2,777,047 | 1/57 | Stevens | 321—25 |
| 2,854,620 | 9/58 | Steinitz | 323—66 |
| 2,857,563 | 10/58 | Syrbe | 321—25 |
| 2,880,374 | 3/59 | Mulder | 219—131 |
| 2,896,147 | 7/59 | Huge | 321—25 |
| 2,924,750 | 2/60 | Mulder | 323—89 |
| 2,971,147 | 2/61 | Christie et al. | 321—25 |
| 3,005,145 | 10/61 | McNamee | 321—25 |

FOREIGN PATENTS 718,594  11/54  Great Britain.

LLOYD McCOLLUM, *Primary Examiner.*

MAX L. LEVY, SAMUEL BERNSTEIN, MILTON O. HIRSHFIELD, *Examiners.*

UNITED STATES PATENT OFFICE
CERTIFICATE OF CORRECTION tent No. 3,199,016

August 3, 1965

William J. Greene et al.

It is hereby certified that error appears in the above numbered patent requiring correction and that the said Letters Patent should read as corrected below.

Column 1, line 29, strike out "is relatively small due to the regulatory action of", and insert instead -- which supplies current to the load or utilization de- --; column 3, line 33, for "12" read -- 2 --; column 5, line 6, for "chossing" read -- choosing --; column 6, line 29, for "sysetm" read -- system --; column 9, line 56, for "transmissive" read -- transmission --.

Signed and sealed this 25th day of January 1966.

(SEAL)
Attest:

ERNEST W. SWIDER
Attesting Officer

EDWARD J. BRENNER
Commissioner of Patents